(12) United States Patent
Sayyarrodsari et al.

(10) Patent No.: US 11,119,455 B2
(45) Date of Patent: Sep. 14, 2021

(54) CONTROL SYSTEM DATABASE SYSTEMS AND METHODS

(71) Applicant: ROCKWELL AUTOMATION TECHNOLOGIES, INC., Mayfield Heights, OH (US)

(72) Inventors: Bijan Sayyarrodsari, Austin, TX (US); Kadir Liano, Pflugerville, TX (US); Alexander B. Smith, Round Rock, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1354 days.

(21) Appl. No.: 14/995,989

(22) Filed: Jan. 14, 2016

(65) Prior Publication Data

US 2016/0132028 A1 May 12, 2016

Related U.S. Application Data

(63) Continuation of application No. 14/077,006, filed on Nov. 11, 2013.

(51) Int. Cl.
*G05B 13/04* (2006.01)
*G06F 16/90* (2019.01)
*G06F 16/901* (2019.01)

(52) U.S. Cl.
CPC ....... *G05B 13/048* (2013.01); *G06F 16/9024* (2019.01)

(58) Field of Classification Search
CPC ............ G05B 13/048; G06F 16/9024
USPC ........................................... 707/723
See application file for complete search history.

(56) References Cited

U.S. PATENT DOCUMENTS

| 6,175,770 | B1* | 1/2001 | Bladow ............ G05B 19/0421 700/2 |
| 6,549,034 | B1* | 4/2003 | Pietrzyk ............ G05B 19/054 326/10 |
| 7,881,815 | B2 | 2/2011 | Srinivasan et al. |
| 8,155,761 | B2 | 4/2012 | Felts et al. |
| 8,527,252 | B2 | 9/2013 | Kephart et al. |
| 2004/0049299 | A1* | 3/2004 | Wojsznis ............ G05B 11/32 700/29 |
| 2005/0075738 | A1* | 4/2005 | Attarwala ............ G05B 13/048 700/44 |
| 2005/0075993 | A1 | 4/2005 | Jang et al. |
| 2006/0125421 | A1 | 6/2006 | Costa |
| 2006/0265098 | A1* | 11/2006 | Gould ............ G05B 19/40938 700/121 |
| 2007/0078533 | A1 | 4/2007 | Caldwell et al. |

(Continued)

OTHER PUBLICATIONS

Extended European Search Report for EP Application No. 14192470.4 dated Mar. 30, 2015.

(Continued)

*Primary Examiner* — Mohsen Almani
(74) *Attorney, Agent, or Firm* — Fletcher Yoder, P.C.

(57) ABSTRACT

The embodiments described herein include one embodiment that provides a control method that includes connecting a first controller to a control system; receiving control system configuration data from a database, in which the configuration data comprises holistic state data of a second controller in the control system; and configuring operation of the first controller based at least in part on the configuration data received.

20 Claims, 6 Drawing Sheets

(56) References Cited

U.S. PATENT DOCUMENTS

2012/0078869 A1    3/2012  Bellville et al.
2012/0084508 A1    4/2012  Suzuki
2013/0212129 A1*   8/2013  Lawson ............. G05B 19/4185
                                                        707/779

OTHER PUBLICATIONS

Furtado et al., "Configuration and Operation of Networked Control Systems over Heterogeneous WSANs", ACM Transactions on Embedded Computing Systems, ACM, New York City, NY, vol. 13, No. 1s, Dec. 6, 2013.
Mobject; Industrial Control; http://www.mcobject.com/industrialcontrol.shtml; Feb. 3, 2014.
Empress Software Inc.; Empress Embedded Database; http://www.empress.com/products/rdbms.html; Feb. 3, 2014; pp. 1-2.
Falkenroth, E. T., et al.; Using an Embedded Active Database in a Control System Architecture; Dept. of Computer and Information Science, Linkoping University; pp. 1-14.
Communication pursuant to Article 94(3) EPC for Application No. 14192470.4 dated Mar. 30, 2020, 8 pages.

\* cited by examiner

CONTROL SYSTEM DATABASE SYSTEMS AND METHODS

CROSS-REFERENCE TO RELATED APPLICATION

This application is a continuation of U.S. patent application Ser. No. 14/077,006, which was filed on Nov. 11, 2013, which is incorporated by reference herein in its entirety for all purposes.

BACKGROUND

The present disclosure generally relates to control systems, and more particularly, to the use of a database within a control system decision cycle.

Generally, a control system, in an industrial plant, complex process, or system, may involve a complex decision making process to determine the proper control action for a given control cycle. For example, in a model-based control system (e.g., a model predictive control system), the decision making process may involve a systematic search process (e.g. optimization search) based on process models, operational constraints, and decision bounds, which may all be functions of operational conditions of the process being controlled. The need for computational efficiency has generally resulted in embedding these functions explicitly within the optimization problem formulation. As a consequence any change to these functional dependencies may require reformulation of the optimization problem.

Another instance of a complex decision making process arises when the control system includes multiple interrelated controllers. For example, a first controller (e.g., a model predictive controller) may perform an optimization search to determine a control action to be taken during a control cycle. In performing the optimization search, the first controller may utilize an operational parameter of the control system, such as temperature of a boiler, as an input variable. In some systems, the operational parameter may be determined by a second controller in the control system. Thus, the first controller may request the desired operational parameter from the second controller. However, as can be appreciated, the second controller may also perform functions, such as its own optimization search or gathering operational parameters. In other words, the first controller may interrupt the operation of the second controller to obtain the desired operational parameter, which may reduce the efficiency of the second controller and the control system overall.

More generally, many systems utilize various automation components, such as controllers, that operate virtually independently, but the actions of which may affect other elements of a controlled machine, plant or process. In some environments, logs or shared databases are used to store various values during control, as well as error notices, and so forth. Such storage approaches, however, are limited to accessing the data at the beginning of a decision cycle by the individual controllers. For example, in a model predictive controller, the data is read only at the beginning of the optimization process. The existing paradigm for data access is historically dictated by often relatively slow and cumbersome access to the data, particularly for data that is needed by the same controller over time, and data useful for other controllers.

Accordingly, it would be beneficial to devise a new architecture for the control system that enhances data communication efficiency within the control system. For example, the data storage, access, and utilization may be altered to yield new paradigms for large scale distributed control systems that are potentially deployed with a large geographical footprint.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides a control method that includes connecting a first controller to a control system; receiving control system configuration data from a database, in which the configuration data comprises holistic state data of a second controller in the control system; and configuring operation of the first controller based at least in part on the configuration data received.

A second embodiment provides a control method that includes determining an intermediate search result in a first controller during an optimization search; receiving data from a database, wherein the data comprises data determined by and written to the database by the same controller at a previous time or by a second controller; and determining a next search result in the optimization search based at least in part on the data received.

A third embodiment provides a control system that includes a first controller; a second controller; and a database communicatively coupled to the first controller and second controller, wherein the database is configured to facilitate communication of data from the first controller to the second controller by storing the data received from the first controller; and in response to a request from the second controller, transmitting the stored data to the second controller, in which the second controller is configured to configure its operation based at least in part on the stored data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
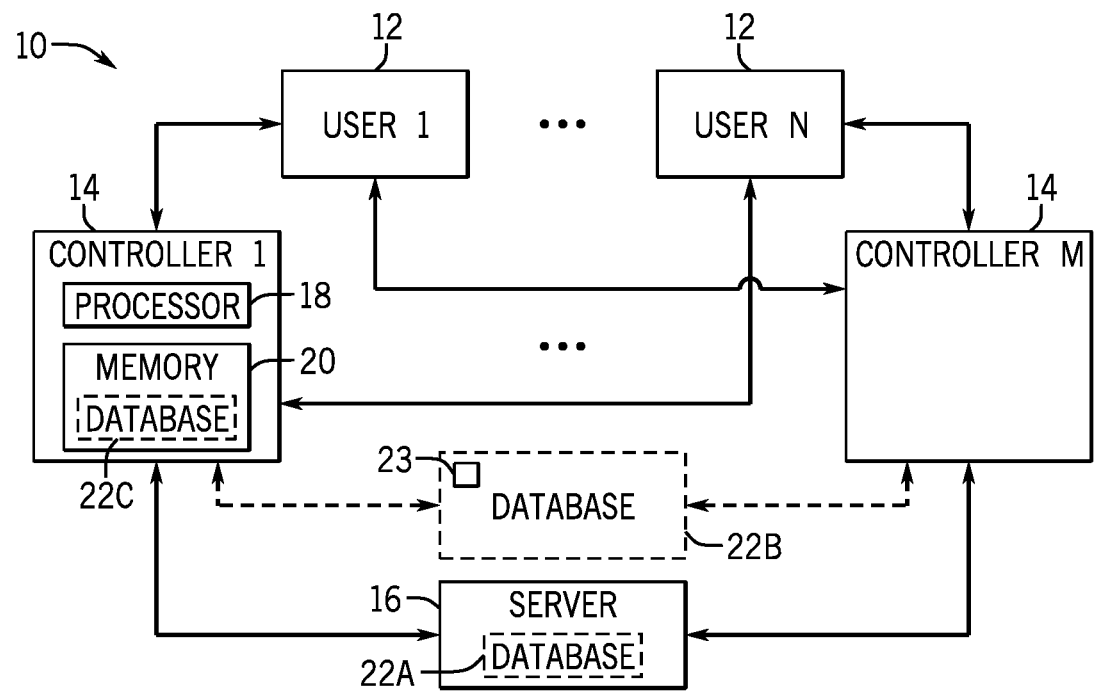
FIG. 1 depicts a block diagram of a control system utilizing a database, in accordance with the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed above, control systems may include multiple interrelated automation components, such as controllers. More specifically, controllers may utilize operational parameters (e.g., temperature, pressure, or flow rate) either directly measured, or virtually measured, or determined by other controllers. Additionally, controllers may employ the computing power of other controllers to perform functions. For example, a first controller (e.g., a hybrid model predictive controller, for which the decision variables include both integer and continuous variables and the search process solves a mixed integer linear or nonlinear programming problem) may utilize a second controller to determine a search result for a first optimization search branch and a third controller to determine a search result for a second optimization search branch. The first controller may then compare the search results returned by the second and third controllers to select the better (e.g., less costly) search result as the criterion for its branching function in the course of its mixed integer linear or nonlinear optimization.

Thus, the operation of the control system may be based on the ability to communicate data between the various controllers in the system. For example, based on the examples described above, the data communicated may include operational parameters and/or search results. Additionally, as can be appreciated, to gather such data, a controller may need to determine the configuration (e.g., architecture) of the rest or at least part of the rest of the control system. For example, the first controller may determine that the second controller determines the desired operational parameter. Similarly, the first controller may determine that the second controller has the ability (e.g., appropriate computing power, model, and/or objective function) to perform the optimization search down the first search branch and that the third controller has the ability to perform the optimization search down the second search branch.

In certain embodiments, an optimal control trajectory required to control a process or a system may be determined by solving the following:

$$\min(u_k, z_k) \Gamma(\hat{y}_k, \hat{y}_k^{Trajectory}), \text{subject to:}$$

$$w_k = f(u_k, z_k, \rho);$$

$$\theta_k = f(u_k, z_k, w_k);$$

$$x_k = F_k(u_k, z_k, x_{k-1}, \theta_k);$$

$$y_k = G_k(u_k, z_k, x_k, \theta_k); \text{ and}$$

$$L < u_k < H;$$

where $\Gamma(\ )$ is the cost function capturing the control objectives, $\hat{y}_k$ is the controlled variable outputs ($\hat{y} \in y$), and $\hat{y}_k^{Trajectory}$ is an explicit or implicit representation of a desired output variable trajectory, $u_k$ is the continuous decision variable (e.g., a manipulated variable), and $z_k$ is the discrete decision variable (e.g. an on/off decision on whether a given unit should be on or off). In addition, constraints (e.g., L and H) may be trajectory functions. The minimization of the above objective function is achieved through adjustments to the continuous decision variables $u_k$, and discrete decision variables $z_k$. Note that the optimization problem above is merely illustrative and is not intended to be limiting. For example, in other embodiments, the objective function $\Gamma(\ )$ may be defined to include penalties on decision variables $u_k$ and $z_k$. In the absence of $z_k$ the optimization problem may be reduced to the commonly formulated model predictive control solution without integer decision variables.

Based on the above, the system under control is modeled as a parametric hybrid model defined by a general state space description where the evolution of state $x_k$ is defined as $x_k = F_k(u_k, z_k, x_{k-1}, \theta_k)$ and the output of the system is described as $y_k = G_k(u_k, z_k, x_k, \theta_k)$ where $F_k$ and $G_k$ are in general nonlinear functions of state $x_k$, decision variables $u_k$ and $z_k$, and parameter vector $\theta_k$ that captures system parameters that are not decision variables for the optimizations problem or outputs of the process, but whose value may impact behavior of the process (e.g., a reaction rate that impacts the outcome of a chemical reaction but is neither an input to the reaction nor a product of the reaction). In the parametric hybrid model above, the parameter $\theta_k$ is explicitly modeled as $\theta_k = f(u_k, z_k, w_k)$ and hence the value of $\theta_k$ may change automatically as a function of operating condition of the system. Furthermore, $\theta_k$ is potentially a function of $w_k$ which is the output of another model that may be purely empirical (e.g., black box).

To minimize the optimization objective $\Gamma(\hat{y}_k, \hat{y}_k^{Trajectory})$, in general, a mixed integer nonlinear (or linear) programming algorithm is needed. An important step in this search process is often a branch and bound procedure where the optimizer discards large subsets of candidate solutions based on estimates on the quality of the candidate solutions. In some embodiments, the search algorithm may calculate the estimates for the quality of the candidate solutions internally. In a large scale control system however, it is possible to use a second controller (or an estimate by that same controller at an earlier time) to estimate the quality of the presently viable candidate solutions. In one embodiment of this disclosure, we propose the use of an entry in a database (e.g., made by the controller at a previous time or by a second controller) as a mechanism for communicating the necessary information for branching operation in the course of a search process (e.g., optimization search) in real time.

In some embodiments, the controllers may retrieve desired data directly from one another. For example, the first controller may request the data from the second controller. In response to the request, the second controller may gather the requested data (e.g., stored in memory) and send the requested data back to the first controller. As can be appreciated, the second controller may perform various functions, such as controlling connected devices. Thus, to gather and send the requested data may interrupt the current operation of the second controller, which may reduce the efficiency of the second controller and the control system as a whole.

Accordingly, embodiments of the present disclosure utilize a database to improve the efficiency of data transfer within the control system. For example, one embodiment describes a control method that includes determining an intermediate search result in an optimization search in a first controller; receiving data from a database, in which the data comprises data determined by and written to the database by a second controller; and determining a next search result in the optimization search based at least in part on the data received. Another embodiment describes a control method that includes connecting a first controller to a control system; receiving control system configuration data from a database, in which the configuration data comprises holistic state data of a second controller in the control system; and configuring operation of the first controller based at least in part on the configuration data received. In some embodiments, the holistic state data of the second controller may include current and past measurements of the process inputs/outputs variables, status information (e.g., including status for measurements, unit operation status, solver status at the end of search process), control matrix structure, model, & parameters, optimization problem formulation (e.g., including objective function, constraints set), and predictions of the controller action, or any combination thereof. Holistic state data may be communicated between different modules using an intelligent communication protocol that may improve data transfer efficiency (e.g., transferring only changes to the holistic state data).

In other words, a controller may gather desired data from the database, for example during an optimization search (e.g., decision making loop), instead of directly from the other controllers in the control system. That is, the database may standardize communication between the controllers in the control system. Accordingly, the communication efficiency of the control system may be improved because the interruption of controller operations to request data may be reduced. Additionally, control system security may be more easily managed because security improvement efforts may be more heavily focused on the database. For example, management of the database may be restricted to authorized personnel. Furthermore, the modularity and integration (e.g., between different controller types) within the control system may be improved because interactions between the various controllers in the control system are standardized through the database. For example, components in the control system may be changed/replaced (e.g., during maintenance or diagnostics) without interrupting controller execution. Moreover, timing issues within the control system may be reduced because data may asynchronously be communicated between controllers via the database. That is, controllers may avoid synchronizing their respective clocks (e.g., timing) to communicate data.

The state (e.g., holistic state data) of each controller in the control system may also be captured. More specifically, instead of merely capturing the previous input/output variables, the state of the controller may include the controller's model, objective function, input variables, output variables, constraints, a control matrix, a status, predicted controller actions, controller settings, an optimization state, or any combination thereof. The additional state data captured may improve diagnostic analysis of the control system. For example, the control system's response to an event (e.g., addition of a catalyst to a boiler) may be analyzed to determine whether the controller model's accurately accounted for the event. Additionally, a controller may self-configure (e.g., determine which controller to utilize for branching in a search process) based on the state data of the other controllers in the control system. In other words, the controller may determine the architecture of the control system (e.g. connectivity of a distributed control system) and configure itself accordingly. Thus, in some embodiments, the state data for the controllers in the control system may be stored in a database and provided to individual controllers to enable them to self-configure. Moreover, in some embodiments, the state of the controllers 14 may be captured and stored in a standardized format, which may improve the modularity and integration within the control system 10 because each component may utilize (e.g., understand) the same state formatting.

By way of introduction, an embodiment of a control system 10 (e.g., model-based control system or distributed control system) is depicted in FIG. 1. As depicted, the control system 10 may include multiple users 12 (e.g., User 1 . . . User N) communicatively coupled to various controllers 14 (e.g., Controller 1 . . . Controller M), and a server 16 communicatively coupled to the controllers 14. The controllers 14 described herein may include model predictive controllers, modeless controllers, proportional-integral-derivative controllers, and the like. In some embodiments, the components (e.g., users 12, controllers 14, and server 16) in the control system 10 may be communicatively coupled to form a network such as an EtherNet/IP network, a ControlNet network, a DeviceNet network, a Data Highway Plus network, a Remote I/O network, a Foundation Fieldbus network, a Serial, DH-485 network, a SynchLink network, or any combination thereof.

More specifically, each of the users 12 may interact with the various controllers 16 via a human-machine-interface, such as a desktop computer, a laptop computer, or tablet computer. For example, a user 12 may instruct a controller 14 to perform a specific control action (e.g., turn on a boiler) or to view operational parameters of the control system 10 (e.g., temperature of the boiler). To facilitate such operations, the controllers 14 may include one or more processor 18 and memory 20. The memory 20 may store data gathered/ calculated by the controller 14 and/or non-transitory machine readable instructions that may be performed by the processor 18.

Additionally, the control system 10 may include a database 22. As depicted, the database 22 may be optionally located within a controller 14, the server 22, as a standalone module, or any combination thereof. In other words, the database 22 may be a network database 22A, a database module 22B, or an in-memory database 22C. The database 22 may utilize a storage device, such as a flash drive, random access memory (RAM), a disk drive, a tape drive, or the like. However, as described above, the database 22 may be included (e.g., accessed) in a decision making loop (e.g., optimization search). Thus, the type of storage device selected for the database 22 may be dependent on the control cycle (e.g., update speed) of the process being controlled. For example, if the control cycle is only 5 milliseconds, a faster storage device, such as RAM, may be utilized. On the other hand, if the control cycle is 5 minutes, a slower storage device, such as a disk drive, may be utilized. In some embodiments, a combination of storage drives, for example RAM in combination with a disk drive, may be utilized to accommodate a fast process (e.g., short control horizon). For example, the database 22 may include an in-memory database 22C (e.g., RAM) in combination with a network database 22A (e.g., a disk drive). In such an embodiment, the in-memory database 22C may act as a first-in-first-out buffer. In other words, the in-memory database 22C may store a fixed amount (e.g., 5 minutes worth) of data, and as new data is stored, the oldest data may be transmitted to and stored in the network database 22A.

As described above, the database 22 may facilitate communication between controllers 14 within the control system 10. Illustratively, when the control system 10 utilizes a network database 22A, each controller 14 may transmit data through the network to the server 16, such that the data is written into the network database 22A. Similarly, the server 16 may retrieve data from the network database 22A and transmit it to the controllers 14 via the network. Accordingly, each database 22 may include one or more dedicated processing components 23 to facilitate performing such functions (e.g., writing to database 22, searching database 22, and transmitting data from database 22).

Figure 2:
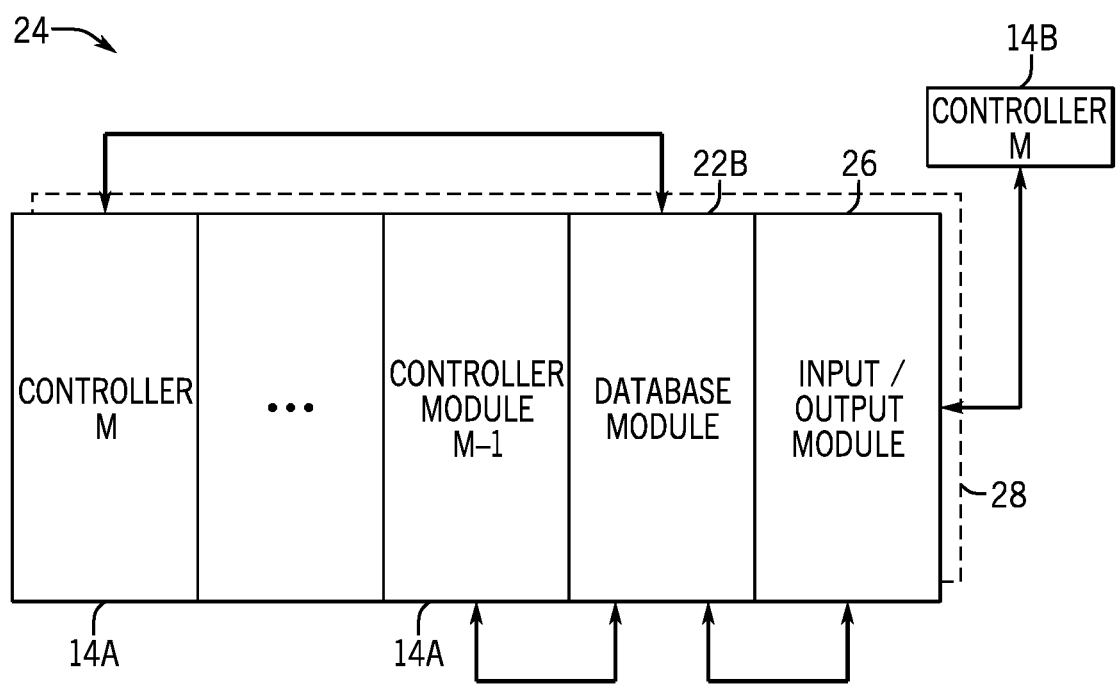
FIG. 2 depicts a block diagram of a database module coupled to a backplane, in accordance with the present disclosure.

Additionally or alternatively, the control system 10 may utilize a database module 22B, as depicted in FIG. 2. As in the depicted embodiment, the database module 22B may be included as a module on chassis, such as a ControlLogix chassis, made available by Rockwell Automation of Milwaukee, Wis. Accordingly, the database module 22B may be communicatively coupled to other modules on the chassis 24, including controller modules 14A (e.g., Controller Module 1 . . . Controller Module M–1) and an input/output module 26, via a communication/power backplane 28. In some embodiments, the communication/power backplane 28 may supply electrical power to each of the connected modules. Additionally, the communication/power backplane 28 may provide a communication interface (e.g., network or bus) between each of the connected modules. Thus, each of the controller modules 14A may transmit data through the communication/power backplane 28 to the database module 22B, such that the data is written into the database module 22B. Similarly, the database module 22B may retrieve data and transmit it to the controller modules 14 via the communication/power backplane 28.

Furthermore, the input/output module 26 may enable communication between modules coupled directly to the chassis 24 and external devices. For example, in the depicted embodiment, an external controller 14B (e.g., Controller M) may communicate with the database module 22B via the input/output module 26. More specifically, the external controller 14B may interface with the input/output module 26, and the input/output module 26 may interface with the database module 22B via the communication/power backplane 28. Thus, the external controller 14B may transmit data through the input/output module 26 and the communication/power backplane 28 to the database module 22B, such that the data is written into the database module 22B. Similarly, the database module 22B may retrieve data and transmit it through the communication/power backplane 28 and the input/output module 26 to the external controller 14B.

Figure 3:
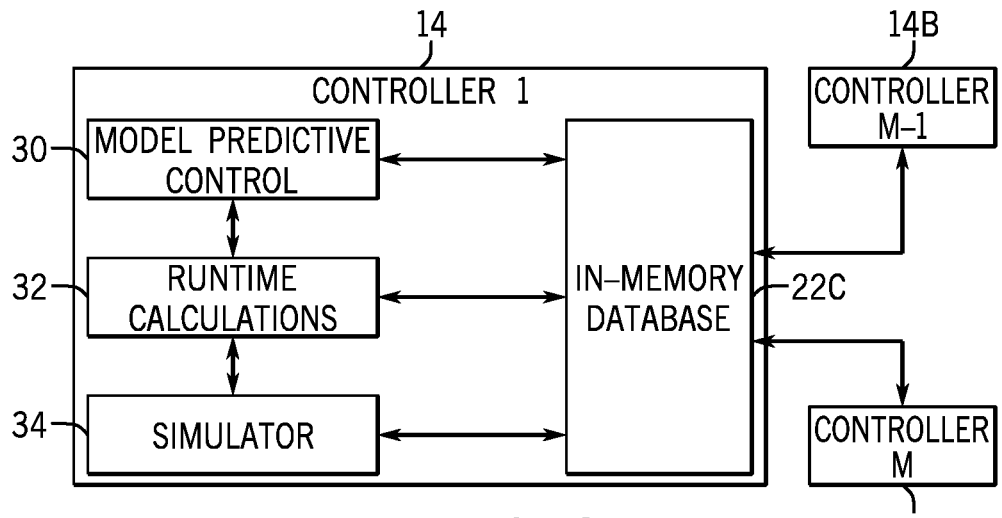
FIG. 3 depicts a block diagram of an in-memory database included in a controller, in accordance with the present disclosure.

As described above, the control system 10 may also utilize an in-memory database 22C, as depicted in FIG. 3. In some embodiments, the in-memory database 22C may utilize portions of the controller's memory 20. Additionally, to reduce the interruption to the operation of the controller 14, a core of the controller processor 18 or an entire processor 18 may be dedicated to operations of the database 22.

Generally, the controller 14, and more specifically the processor 18, may perform various functions, such as model predictive control 30, runtime calculations 32, and a simulator 34. As depicted, each of these functions may communicate data with the in-memory database 22C, for example via a bus that communicatively couples the controller processor 18 and memory 20. As an illustrative example, the model predictive control 30 may receive an operational parameter from the in-memory database 22C, predict a control action based at least in part on the operational parameter, and store the predicted control action in the in-memory database 22C. Similarly, the simulator 34 may receive operational parameters and/or captured controller states (e.g., holistic state data) to simulate operation of a controller 14 and/or the control system 10. The results of the simulation may also be stored in the in-memory database 22C to enable further analysis and diagnostics.

In addition to communicating data between the various functions included in the controller 14, the in-memory database 22C may enable communication of data with or between external controllers 14B. For example, a first external controller 14B (e.g., Controller M–1) may store a determined operational parameter in the in-memory database 22C, and the in-memory database 22C may retrieve the operational parameter and transmit it to a second external controller 14B (e.g., Controller M). In other words, although the in-memory database 22C may be included within the controller memory 14, the operation of the in-memory database 22C may be relatively independent from the operation of the controller 14.

Figure 4A:
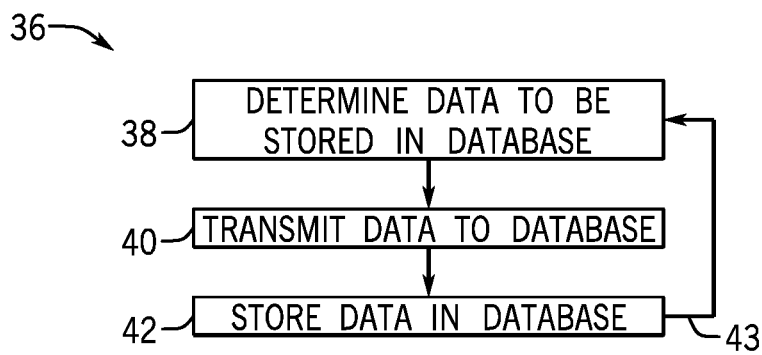
FIG. 4A depicts a flow chart describing a general process for storing data, in the database, in accordance with the present disclosure.

In each of the database embodiments described above, the databases 22 may facilitate communication of data between various components in the control system 10. More specifically, the communication of data may include transmitting data from a first controller to the database 22, and transmitting the data from the database 22 to a second controller. Accordingly, FIG. 4A describes a process 36 for communicating data to the database 22. As depicted, the process 36 may begin by determining data to be stored in the database 22 (process block 38). For example, a first controller may gather an operational parameter (e.g., temperature) from a sensor monitored by the controller. The data may then be transmitted to the database 22 (process block 40). For example, the first controller may transmit the data over the network or bus that communicatively couples the first controller and the database 22. The database 22 may then store the data in the database 22 (process block 42). In some embodiments, the first controller may specify a memory address at which to store the data.

Additionally, process 36 may be periodically (e.g., cyclically) repeated (represented by arrow 43). In other words, data stored in the database 22 may be periodically updated, which may include overwriting or adding to previously stored data, which may facilitate diagnostics. For example, the first controller may periodically add to the operational parameter stored in the database 22 to provide a historical view of the changes in the operational parameter. In some embodiments, the periodic updating 43 may be based on a timer. In other embodiments, the periodic updating 43 may be based on a triggering event, such as a change in the operational parameter monitored by the first controller.

As can be appreciated, each of the controllers 14 in the control system 10 may utilize process 36 to write data to the database 22. In some embodiments, the updating frequency of the controllers 14 may vary. For example, the first controller may update a flow rate of a pipe every 5 millisecond to account for rapid changes in the flow rate, whereas a second controller may update temperature of a boiler every 5 seconds due to the slower changes in temperature.

Figure 4B:
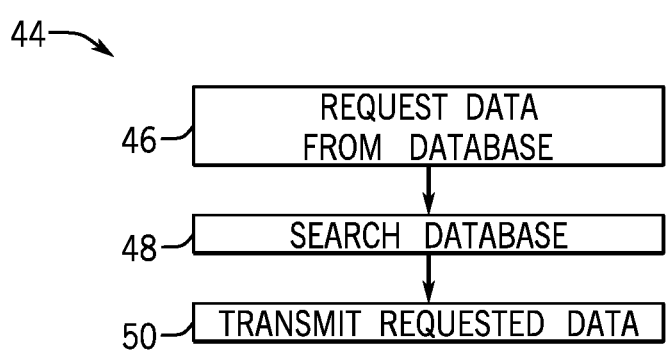
FIG. 4B depicts a flow chart describing a general process for retrieving data from the database, in accordance with the present disclosure.

On the other side, FIG. 4B describes a process 44 for receiving data from the database 22. As depicted, the process 44 may begin by requesting data from the database 22 (process block 46). For example, the second controller may request the operational parameter stored in the database 22 by the first controller. Depending on the functionality of the database 22, the second controller may request the operational parameter with varying levels of specificity. For example, the second controller may simply request a particular operational parameter, specify operational parameters gathered by the first controller, or specify the memory location within the database 22 utilized by the first controller.

The database 22 may then search for the requested data (process block 48). If the requested data is found, the database 22 may transmit the requested data (process block 50). For example, the database 22 may transmit the requested data over the network or bus that communicatively couples the database 22 and the second controller. In some embodiments, if the requested data is not found, the database 22 may return an error message. Thus, by utilizing process 36 and process 44, data from the first controller may be communicated to the second controller via the database 22.

Figure 5:
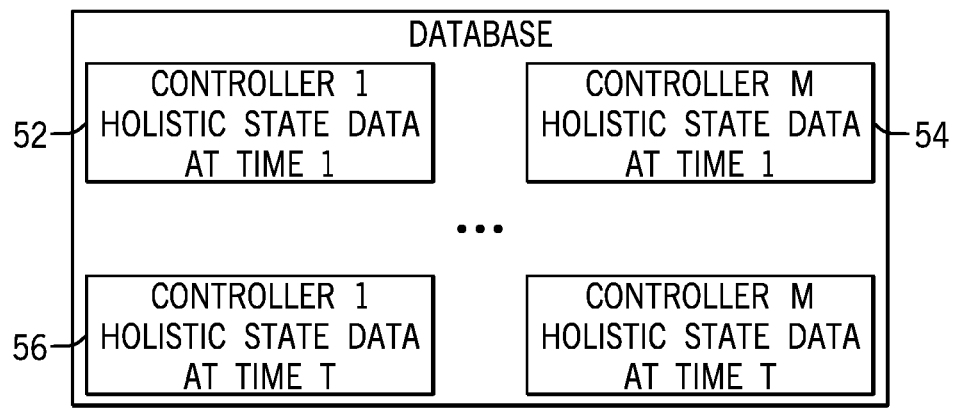
FIG. 5 depicts a block diagram of a database storing holistic state data of multiple controllers, in accordance with the present disclosure.

As described above, in addition to merely storing operational parameters, the database 22 may store captured states of controllers 14, as depicted in FIG. 5. More specifically, the database 22 may store the holistic state data for various controllers 14 in the control system 10. For example, in the depicted embodiment, the database 22 stores the holistic state data for Controller 1 (block 52) through Controller M (block 54). Additionally, the database 22 may store the holistic state data for each controller 14 captured at various time. For example, in the depicted embodiment, the database 22 stores the holistic state data for Controller 1 at Time 1 (block 52) through Time T (block 56). As used herein, "holistic state data" is intended to describe operation/characteristics of a controller 14 (e.g., controller model) that describe the architecture of the control system, which for example may be utilized by other controllers 14 to self-configure, or may be utilized to perform diagnostics, for example by simulating operation of the controller 14.

Figure 6:
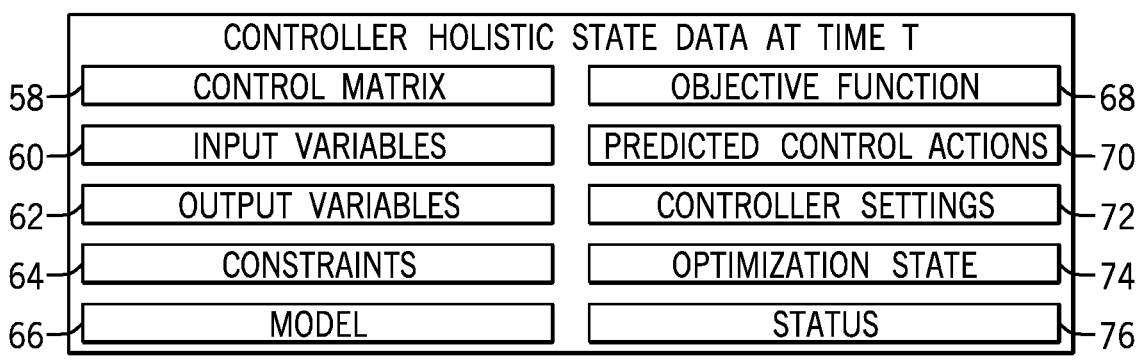
FIG. 6 depicts a block diagram of the holistic state data, in accordance with the present disclosure.

As described above, the controller holistic state data stored in the database 22 may be stored in a standardized format, which may improve the ease of integration and modularity of the control system 10. More specifically, components (e.g., controllers 14) may be easily added and/or replaced because each component may be configured to utilize the standardized holistic state data format. One embodiment of standardized holistic state data 56 is depicted in FIG. 6. As depicted, the holistic state data 56 includes a control matrix field 58, an input variable field 60, an output variable field 62, a constraints field 64, a model field 66, an objective function field 68, a predicted control actions field 70, a controller settings field 72, an optimization state field 74, and a status field 76.

More specifically, the holistic state data 56 may capture the operation of the controller 14. For example, the past and current input variables to the process may be captured by the input variables field 60, and the past and current output variables from the process may be captured by the output variables field 62. In some embodiments, the output variables may additionally include operational parameters gathered by the controller 14, for example from a sensor monitored by the controller 14. In model based controllers, the input variables may include controlled variables and the output variables may include manipulated variables. For a dynamic system with a modeled delay between an input variable and an output variable, the holistic state data may additionally include the measurements of the input/output variables for the time delay interval, for example, between [t0−D, t0] where t0 indicates current time and D indicates the delay length.

Similarly, the constraints field 64 may capture the past and current constraints on the input/output variables, and the predicted control actions field 56 may capture control actions predicted by the controller 14 and the predicted response to the control actions. Additionally, the optimization state field 60 may capture parameters associated with an optimization search, such as intermediate search results and the status of the search, and the status field 62 may capture the status of the controller 14 and/or the devices (e.g., sensors) controlled or monitored by the controller. For example, this may include an indication that a sensor monitored by the controller is malfunctioning.

The holistic state data 56 may also capture the characteristics of the controller 14. For example, the model field 66 may capture a model of a process that describes a relationship between the input variables and output variables. In some embodiments, the model may include a control matrix, which may be captured by the control matrix field 58. The objective function field 68 may similarly capture an objective (e.g., cost) function associated with the process. In some embodiments, the objective function field 68 may further include parameters used to formulate the objective function, which may facilitate understanding of selected control actions for performance evaluation or diagnostics. The controller settings field 58 may capture settings used by the controller 14, such as the interrelationships (e.g., hierarchy or cascade) with other controllers 14 and processing capabilities.

Since the state data is standardized, holistic state data for each controller may include each of these fields regardless of the controller type. For example, the holistic state data 42 for a modeless controller (e.g., PID controller) may populate the model field 50 with "0" or "null" to indicate that the controller 14 does not contain a model. In other embodiments, the standardized holistic state data 42 may include different fields, which may depend on the type of control system 10 and/or the type of controllers 14 utilized in the control system 10.

Additionally, since the holistic state data is standardized throughout the control system 10, the fields in the holistic state data may utilize various short-hand techniques to reduce the burden on the database 22. For example, instead of storing the entire objective function, the objective function field 68 may store the objective function as a string or simply store the coefficients of the objective function. Similarly, the control matrix field 58 may store the size of the control matrix and the values of the matrix as a string. Since the formatting is standardized, a controller 14 receiving the standardized holistic state data may reconstruct the desired data. For example, the controller 14 may reconstruct the control matrix by parsing the string of values based on the size of the control matrix (e.g., place first value in string in first location of matrix and so on).

Furthermore, in some embodiments, standardized holistic state data may enable standardized visualizations. Illustratively, in a control system for a boiler system, controllers may recognize that operational parameters relate to the boiler system and thus depict a boiler visualization. For example, the boiler visualization may include a pipe coupled to the boiler, and the pipe may be labeled with its flow rate.

Figure 7:
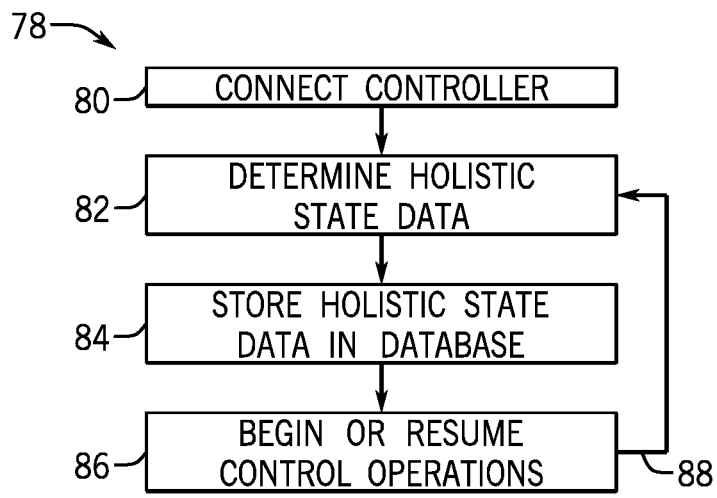
FIG. 7 depicts a flow chart describing a process for storing holistic state data in the database, in accordance with the present disclosure.

In some embodiments, controllers 14 may store their holistic state data in the database 22. One embodiment of a process 78 for storing holistic state data is described in FIG. 7. As depicted, the process 78 may begin when a controller 14 is connected to the control system 10 (process block 80). For example, the controller 14 may be connected to the control system 10 when the controller 14 is plugged into to a power/communication backplane 28. The controller 14 may then determine its holistic state data (process block 82). More specifically, this may include gathering data (e.g., model, objective function, etc.) and populating the holistic state data fields (e.g., model field 66, objective function field 68, etc) with the data. In some embodiments, such data may be stored within the controller memory 20 or a device (e.g., sensor) controlled by the controller 14. The holistic state data may then be transmitted to and stored in the database 22 (process block 84). After the holistic data is stored in the database 22, the controller 14 may begin or resume performing control operations (process block 86). For example, the controller 14 may begin or resume monitoring connected devices (e.g., sensors), controlling connected devices (e.g., actuators), performing a different optimization search, or performing a control action determined by the optimization search (e.g., optimum search result).

In addition to capturing the holistic state data when the controller 14 is initially connected, the controller 14 may also periodically (e.g., cyclically) capture updated holistic state data (represented by arrow 88). Similar to the periodic updating described above, updating the holistic state data may include overwriting or adding to previously stored holistic state data. As will be described in more detail below, adding to the previously stored holistic state data may facilitate diagnostics by enabling the controller at the time the holistic state data was captured to be recreated (e.g., simulated). Additionally, the controller 14 may periodically update 88 its holistic state data based on a timer (e.g., execution frequency of the control system) or a triggering event, such as a change in input variables. In some embodiments, the controller 14 may update only the portions of the holistic state data that change, which may reduce burden on the database 22. Furthermore, the update frequency for each controller in the control system 10 may also vary, for example based on the function of each controller 14 or the interrelationship between controllers 14.

Figure 8:
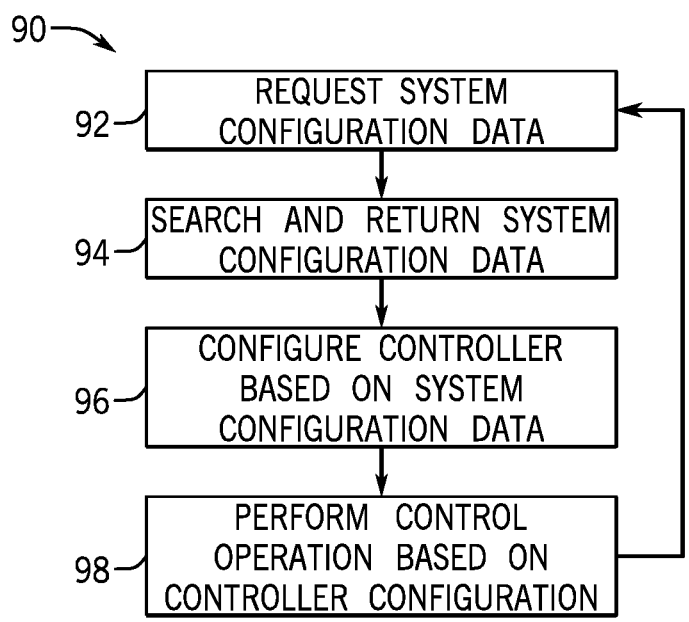
FIG. 8 depicts a flow chart describing a process for configuring a controller based on the control system architecture, in accordance with the present disclosure.

As described above, a controller 14 may utilize the holistic state data stored in the database 22 to self-configure. One embodiment of a process 90 for self-configuring a controller 14 is described in FIG. 8. As depicted, the process 90 may begin when a controller requests system configuration data from the database 22 (process block 92). In some embodiments, the system configuration data may include holistic state data for each of the other controllers 14 in the control system 10. The database 22 may then search for and return the system configuration data to the controller 14 (process block 94). Based on the received system configuration data, the controller 14 may self-configure (process block 96). In some embodiments, the controller may utilize programmatic navigation (e.g., a web crawler) to process the system configuration data. For example, a controller may look at the operational parameters (e.g., output variables) captured in the holistic state data to determine what operational parameters are gathered and by which controllers. Additionally, a controller 14 may look at the model, objective function, controller settings (e.g., interrelationships and computing power), or any combination thereof to determine which controllers may be utilized for computations (e.g., optimization branch searches). The controller 14 may then perform control operations based on its configuration (process block 98). For example, a first controller may self-configure to utilize a second controller to perform an optimization search down a search branch, or the first controller may configure to utilize an operational parameter determined by the second controller.

Figure 9:
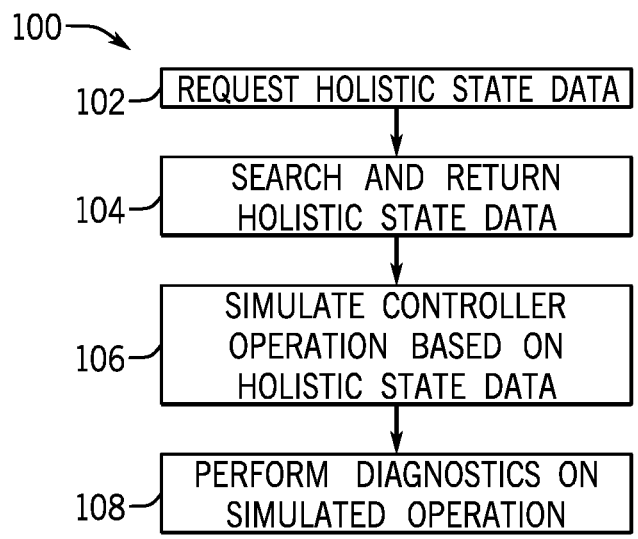
FIG. 9 depicts a flow chart describing a process for performing diagnostics on the control system, in accordance with the present disclosure.

Additionally, as described above, stored holistic state data may be utilized to facilitate control system diagnostics. More specifically, the controller at a specific time (e.g., Time T) may be later recreated based on the holistic state data captured at that time, for example in the controller or another computing device. An embodiment of a process 100 that may be utilized is described in FIG. 9. As depicted, the process 100 may begin by requesting holistic state data from the database (process block 102). More specifically, this may include specifying the controller 14 and time period for the holistic state data, or a specific memory location storing the holistic state data. The database 22 may then be searched for and return the requested holistic state data (process block 104). Based on the holistic state data, the controller 14 may be recreated (e.g., configured) enabling operation of the controller 14 to be simulated (process block 106) and diagnostics to be performed on the simulated operation (process block 108). In some embodiments, this may include performing "What If" analysis by simulating various control actions and analyzing the response. Additionally, in some embodiments, accuracy of the controller may be analyzed. For example, the accuracy of the controller may be determined by comparing the predicted response with the actual response to a particular control action. In some embodiments, this may include determining whether the model accurately accounts for events in the control system, such as the addition of a catalyst to a boiler.

In some embodiments, the process 100 may be performed while the controller 14 is still in operation. Thus, incorrect or unacceptable behavior detected during diagnostics may be correct while the controller is in operation. For example, if it is determined that the controller model is inaccurately modeling the process, the controller 14 may replace the inaccurate model with a new model.

Figure 10:
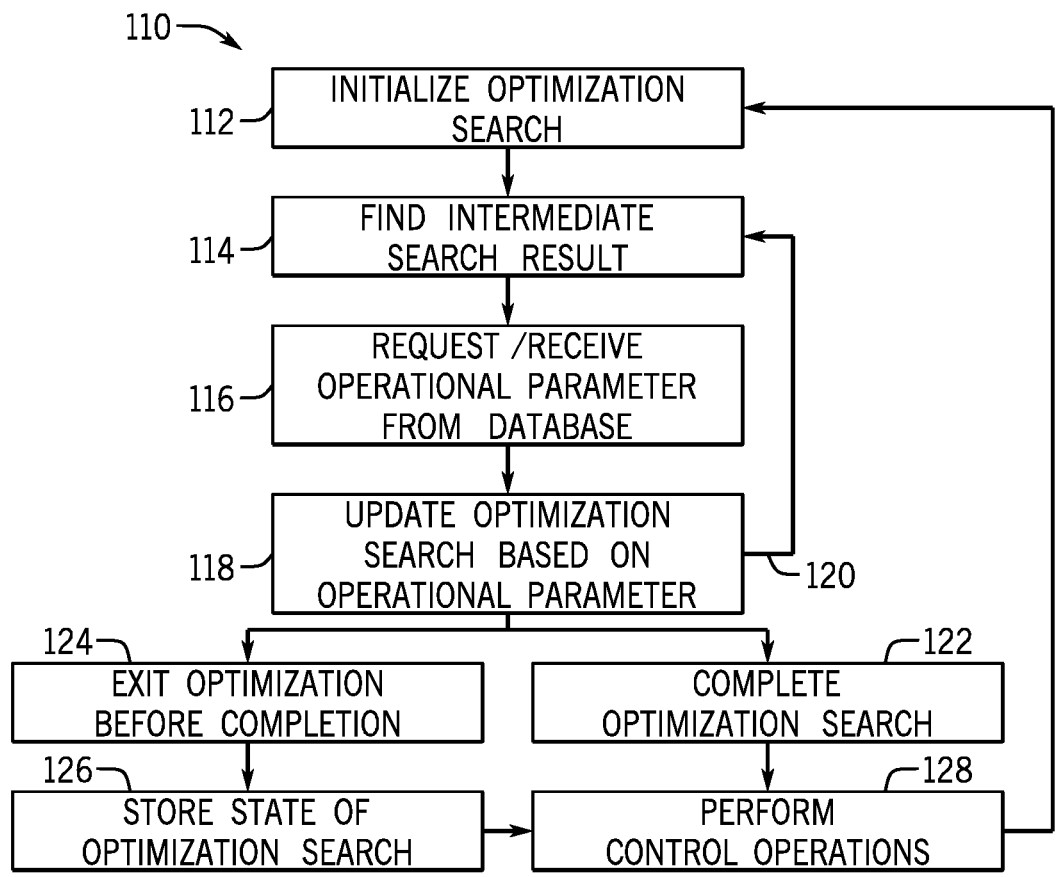
FIG. 10 depicts a flow chart describing a process for an optimization search that utilizes operational parameters stored in the database, in accordance with the present disclosure.

Based on the techniques described above, FIGS. 10-13 describe illustrative embodiments of a controller 14 utilizing a database 22 as an integral part of a decision loop. More specifically, FIG. 10 describes a process 110 for including the database 22 within an optimization search. As depicted, the process 110 includes initializing an optimization search (process block 112), finding an intermediate search result (process block 114), requesting and receiving an operational parameter from the database 22 (process block 116), and updating the optimization search based on the received operational parameter (process block 118). The controller 14 may then find the next search result based on the updated optimization search (arrow 120). The optimization search (e.g., process 110) may continue until the search is completed (process block 122). However, if the optimization search exits before completion (process block 124), the state of the optimization search may be stored (process block 126). In either case, after exiting the optimization search, the controller 14 may continue its control operations (process block 128).

To help illustrate, the process 110 will be described in relation to the graphical representation of an optimization search depicted in FIG. 11. Accordingly, the controller 14 may initialize the optimization search (process block 112) by determining feasible search results 130, constraints 132 to the feasible search results, and an initial search result 134. From the initial search result 134, the controller 14 may then find an intermediate search result 136 (process block 114). Once the intermediate search result 136 is found, the controller 14 may pause the optimization search and request/receive an operational parameter stored in the database 22 (process block 116), for example through process 44. The controller 14 may then utilize the operational parameter to update the optimization search (process block 118). For example, the controller 14 may update the optimization search to account for changes to an input variable (e.g., boiler temperature). The controller 14 may then resume the optimization search and find the next search result 138 based on the updated optimization search (process block 114). The process 110 may continue until an optimum search result 140 is found (process block 122).

On the other hand, if the optimization search exits while at an intermediate search results 136 or 138 (process block 124), the state of the optimization search may be stored (process block 126). In some embodiments, this may include storing the intermediate search results, optimization settings, the updated optimization search, and the like in the optimization state field 74 of holistic state data. Storing the state of the optimization may enable a "hot start" when the optimization search is resumed. In other words, the optimization search may pick up where it left off instead of restarting the entire search.

Figure 11:
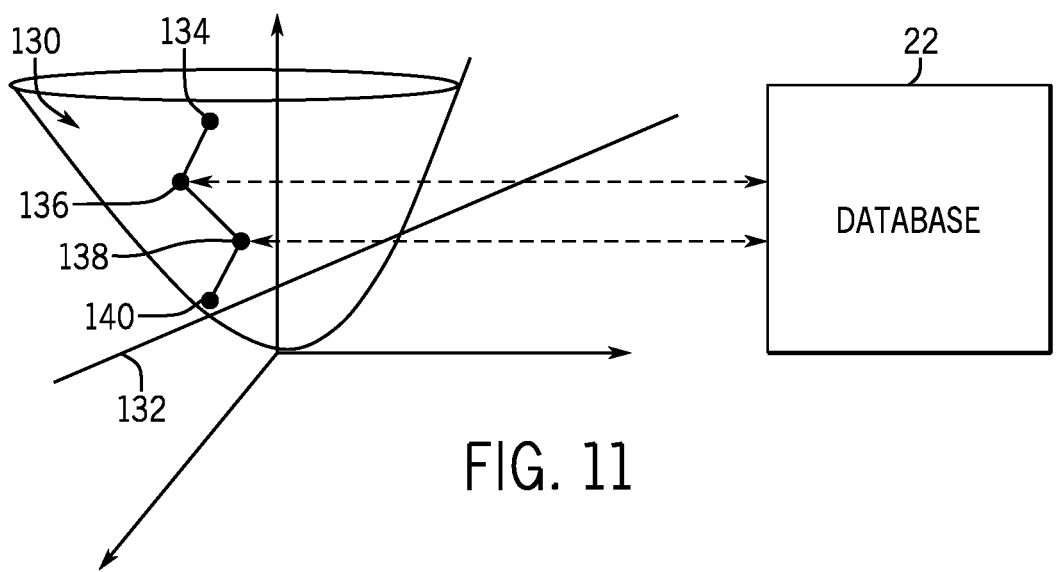
FIG. 11 depicts a graphical representation of the optimization search described in FIG. 10, in accordance with the present disclosure.
Figure 12:
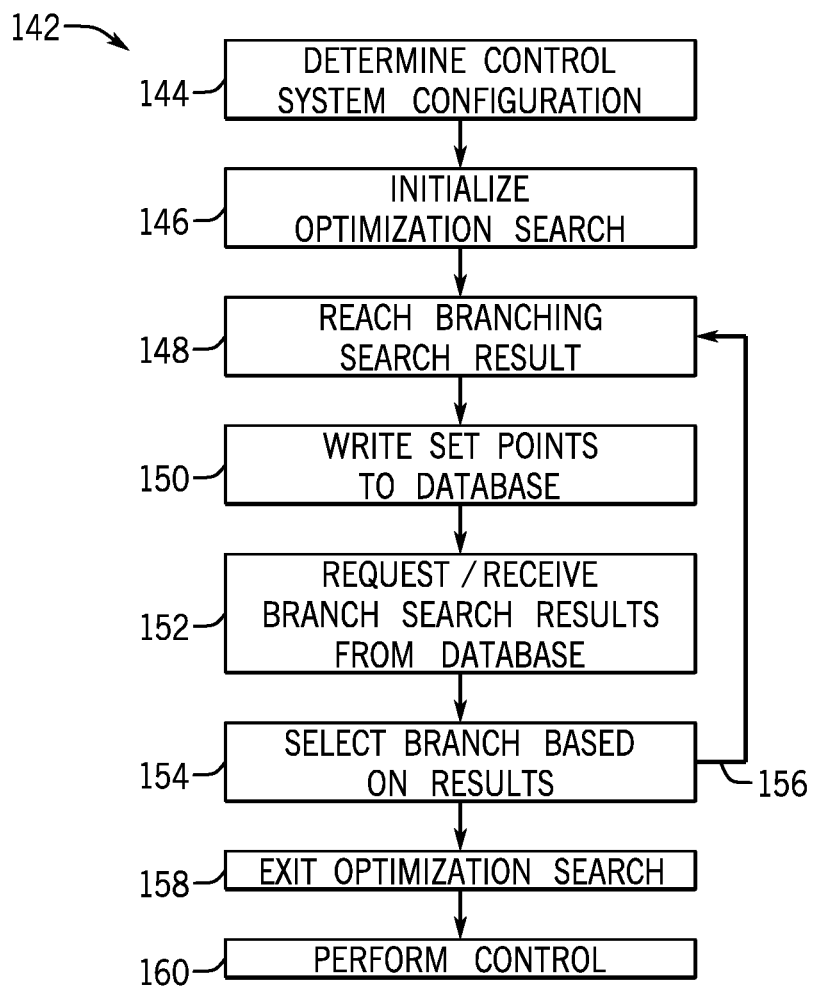
FIG. 12 depicts a flow chart describing a process for an optimization search that utilizes search branch results stored in the database, in accordance with the present disclosure.

Additionally, FIG. 11 describes another process 142 for utilizing a database 22 in an optimization search, for example hybrid model predictive control that includes both continuous and integer decision variables. As depicted, the process 142 includes determining the control system configuration (process block 144), initializing an optimization search (process block 146), reaching a branching search result (process block 148), writing a setpoint for each branch to the database 22 (process block 150), requesting and receiving branch search results (process block 152), and selecting a search branch based on the results (process block 154). Along the selected branch, the controller 14 may then find the next branching search result (arrow 156). Similar to process 110, process 142 may exit the optimization search (process block 158) before or when an optimum search result is found. In either case, after exiting the optimization search, the controller 14 may continue its control operations (process block 160).

Figure 13:
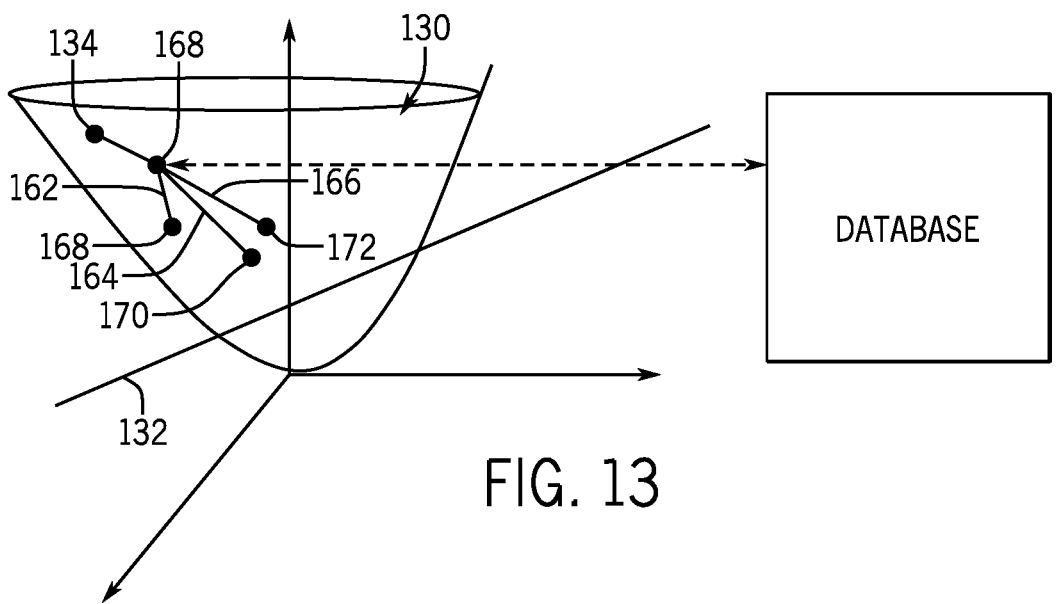
FIG. 13 depicts a graphical representation of the optimization search described in FIG. 12, in accordance with the present disclosure.

To help illustrate, the process 142 will be described in relation to the graphical representation of an optimization search depicted in FIG. 13. In some embodiments, the controller 14 may determine the control system configuration (process block 144) by utilizing process 90. Accordingly, the controller 14 may determine which controllers may be utilized in the optimization search. For example, a first controller may assign a first search branch 162 to a second controller, a second search branch 164 to a third controller, a third search branch 166 to a fourth controller. In other words, the controller 14 may form a hierarchal relationship (e.g., cascading interrelationship) with other controllers by assigning search branches to subordinate controllers (e.g., second, third, and fourth controllers).

The controller 14 may then initialize the optimization search (process block 146) by determining feasible search results 130, constraints 132 to the feasible search results, and an initial search result 134. From the initial search result 134, the controller 14 may then find a branching search result 168 (process block 148). As depicted, three potential search branches (e.g., 162, 164, and 166) extend out from the branching search result 168. At the branching search result 168, the controller 14 may pause the optimization search and write a setpoint for each search branch to the database 22 (process block 150). The subordinate controllers assigned to each search branch may then retrieve its setpoint, for example through process 44, and perform an optimization search based on the setpoint. For example, the second controller may determine a first search 168, the third controller may determine a second search result 170, and the fourth controller may determine a third search result 172. Each subordinate controller may then write its determined search result to the database 22, for example through process 36. Thus, in some embodiments, the optimization search down each search branch may be parallelized to improve search efficiency because each subordinate controller may search simultaneously.

The controller 14 may then request/receive the search results for each search branch from the database 22 (process block 152). Based on the search results, the controller 14 may resume its optimization search and select a search branch (process block 154). In some embodiments, the controller 14 may utilize the objective function to compare the cost of performing each returned search result and choose the least costly. The process 142 may then continue by finding a next branching search result (process block 148) or exit the optimization search (process block 158).

Although the techniques described herein are generally described in relation to a physical control system as depicted in FIG. 1, the techniques may additionally be applied to "table top" control systems (e.g., control systems simulated on a computing device). Additionally, the techniques described herein may be utilized locally or remotely (e.g., via the cloud). Furthermore, the techniques described herein may enable the control system to integrate with an economic optimization engine, which may determine the overall economic profitability of the operation. Moreover, although the techniques described herein are generally described in relation to controllers 14, the techniques may additionally be applied to other components in the control system 10 (e.g., server 16, user 12, or other automation device) that may utilize the data stored in the database 22.

The technical effects of the present disclosure include improving communication efficiency within a control system 10. More specifically, a database 22 may be utilized to standardize communication between various controllers 14 in the control system 10. Thus, interruption of controller operations to request data may be reduced, security improvement efforts may be more heavily focused on the database 22, modularity and integration within the control system 10 may be improved, and timing issues within the control system 10 may be reduced. Furthermore, in some embodiments, the database 22 may store holistic state data for each controller 14 in the control system 10, which in some embodiments may be standardized for the control system 10. Thus, control system diagnostics may be improved by simulating controller operation, controllers in the control system may self-configure, and the modularity and integration within the control system 10 may be improved.

As discussed above, the present techniques are particularly well suited to applications that utilize model based controllers, although they are not limited to such applications. In summary, model-based control systems have been pervasive in many facets of modern life. Examples include the process industry, the power industry, automotive, oil and gas exploration, aerospace, and even closed loop decision support systems used for planning and scheduling. As used herein, model-based control systems refer to a control system whose output relies at least on the following two inputs:

(i) The current and/or past process measurements (actual and/or virtual), and
(ii) The output of a model that may receive process measurements and produces at least one value that modifies controller structure.

Based on the definition above, a model-less controller (e.g., a PID controller) may be a model-based control system for which the second input is zero.

Given the role of the control systems, secure, robust, and timely operation of controllers in the control system is important in real-world applications. More specifically, the performance of a control system based on the following abilities:

(i) Ability to assess the quality of the model: The model that is being used by a controller may play a critical role in the success of the control strategy. Depending on the application, the models may be assed online and/or offline
(ii) Ability to monitor controller performance: The performance of controllers may be monitored in two different metrics:
  1) An instantaneous measure of performance (e.g. a running standard deviation from a desired setpoint), and
  2) A predictive performance metric where, in addition to the controlled system behavior, the predicted process response to planned control actions is used to analyze performance. One example is performance monitoring for a batch reaction where both measured and anticipated process responses are used to quantify controller performance against "a golden batch" standard.
(iii) Ability to account for "events": Events may impact process behavior but are often not treated as a measured process value. One example is when an operator introduces a new catalyst to initiate a transition, which in some embodiments may simply recorded in a spreadsheet. Another example is when a plant operates under abnormal conditions. Illustratively, a failed actuator may result in poor performance by the control system while the control strategy is optimal for normal operation conditions. Thus, such events may be accounted for to better monitor performance of the control system.
(iv) Ability to perform diagnostics: Diagnostics can take different flavors:
  1) Detecting that the controller performance is no longer acceptable.
  2) Identifying the source of the detected unacceptable performance.
  3) Modifying the controller to improve its performance preferably without completely shutting down the control system.

To perform diagnostics, the controllers response may be revisted for a desired time period in the past. In some embodiments, inputs may be varied to examine controller behavior under these altered conditions. It is a significant leap from the state of the art if this extensive analysis is performed while the controller is still running with the possibility of changing controller structure to correct unacceptable behavior.

(v) Ability to enable asynchronous and simultaneous multi-user controller access: The ability to do all the activities listed above by multiple users asynchronously accessing the controller remotely.

Performing the tasks listed above may impose significant demands on data management and data flow efficiency within a control system, and the innovations presented in the present disclosure may greatly facilitate operation of the automation systems. As can be appreciated, deterministic execution requirements of the controllers has led to control systems that avoid databases as a node within a controller's decision loop (e.g., optimization search). In other words, existing control system architectures are designed with the assumption that a controller does not query a database to determine its next move (e.g., control action). The foregoing techniques allow for the use of an integrated or on-board database that can facilitate automation operations while avoiding the drawbacks associated with prior paradigms for the storage, access and use of automation data.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automation system comprising:
an actuator configured to implement a control action to facilitate performing an automation process in the automation system;
a sensor configured to measure an operational parameter of the actuator; and
a control system communicatively coupled to the actuator and the sensor, wherein:
  the control system comprises a plurality of processors and memory implemented in a plurality of controllers; and
  the memory is configured to store instructions that, when executed by one or more processors of the plurality of processors, cause the one or more processors to:
    determine holistic state data comprising a first field that indicates input variables to the automation process, a second field that indicates output variables from the automation process, a third field that indicates a process model that describes relationship between the input variables and the output variables of the automation process, a fourth field that indicates constraints on the input variables of the automation process, and a fifth field that indicates an objective function, wherein a first controller of the plurality of controllers is configured to self-configure an interconnection with a second controller selected from the plurality of controllers based on the holistic state data;

determine the control action to be implemented by the actuator based at least in part on the operational parameter of the actuator measured by the sensor and the process model, the input variables, the output variables, the constraints, and the objective function indicated in fields of the holistic state data; and instructing the actuator to implement the control action to facilitate optimizing performance of the automation process.

2. The automation system of claim 1, wherein the control system comprises:

a chassis comprising a backplane; and a first controller module, wherein:

the first controller module comprises the first controller; and the first controller module is configured to receive electrical power and communicate via the backplane when the first controller module is connected to the chassis.

3. The automation system of claim 2, wherein the control system comprises a second controller module, wherein the second controller module comprises the second controller; and the second controller module is configured to receive electrical power and communicate with the first controller module via the backplane when the first controller module and the second controller module are connected to the chassis.

4. The automation system of claim 2, wherein:

the control system comprises an input/output module configured to communicate via the backplane when connected to the chassis; and the second controller is external from the chassis and configured to communicate with the first controller module via the input/output module when the input/output module is connected to the chassis and the second controller is communicatively coupled to the input/output module via one or more data buses.

5. The automation system of claim 1, wherein the holistic state data comprises:

first holistic state data associated with the first controller, wherein the control system is configured to receive the first holistic state data from the first controller when the first controller is initially deployed in the control system; and second holistic state data associated with the second controller, wherein the control system is configured to receive the second holistic state data from the second controller when the second controller is initially deployed in the control system.

6. The automation system of claim 1, wherein the control system is configured to provide the holistic state data to the first controller when the first controller is initially deployed in the control system to enable the first controller to self-configure the interconnection with the second controller such that the first controller uses the second controller as a subordinate controller.

7. The automation system of claim 1, wherein the holistic state data comprises:

a sixth field that indicates computational capabilities of the plurality of controllers implemented in the control system; and a seventh field that indicates interconnections between controllers of the plurality of controllers, interconnections between the plurality of controllers and one or more automation components, or both in the control system.

8. The automation system of claim 1, wherein the control system is configured to:

formulate an optimization problem based at least in part on the process model, the input variables, the output variables, the constraints, and the objective function indicated in the fields of the holistic state data; and determine the control action to be implemented by the actuator by performing an optimization search to solve the optimization problem formulated by the control system.

9. The automation system of claim 1, wherein:

the first controller comprise a first one or more processors and first memory; and the second controller comprises a second one or more processors and second memory.

10. A tangible, non-transitory computer-readable medium that stores instructions executable by one or more processors of a control system, wherein the instructions comprise instructions to:

instruct, using the one or more processors, the control system to provide control system configuration data to a first controller when the first controller is initially connected in the control system, wherein the control system configuration data comprises a first field that indicates a process model that describes relationship between input variables and output variables of an automation process, a second field that indicates constraints on the input variables of the automation process, a third field that indicates an objective function, and a fourth field that indicates that a second controller implemented in the control system determines an operational parameter of an actuator measured by a sensor;

self-configure, using the one or more processors, an interconnection between the first controller and the second controller at least in part by selecting the second controller from a plurality of controllers in the control system based at least in part on the third field of the control system configuration data that indicates that the second controller determines the operational parameter of the actuator measured by the sensor;

formulate, using the one or more processors, an optimization problem based at least in part on the first field of the control system configuration data that indicates the process model, the second field of the control system configuration data that indicates the constraints on the input variables, and the third field of the control system configuration data that indicates the objective function;

determine, using the one or more processors, a control action to be implemented by the actuator to facilitate performing the automation process by solving the optimization problem based at least in part on the operational parameter of the actuator measured by the sensor; and instruct, using the one or more processors, the actuator to implement the control action to facilitate optimizing performance of the automation process.

11. The tangible, non-transitory, computer-readable medium of claim 10, wherein the instructions to instruct the control system to provide the control system configuration data to the first controller comprise instructions to provide the control system configuration data to the first controller when a controller module comprising the first controller is coupled to a backplane of a control system chassis.

12. The tangible, non-transitory, computer-readable medium of claim 10, wherein the control system configuration data comprises a sixth field that indicates computing capability of the second controller.

13. The tangible, non-transitory, computer-readable medium of claim 10, wherein the control system configuration data comprises a plurality of holistic state data each corresponding with one of a plurality of automation components.

14. The tangible, non-transitory, computer-readable medium of claim 13, wherein the instructions to self-configure the interconnection between the first controller and the second controller comprise instructions to parse each of the plurality of holistic state data.

15. The tangible, non-transitory, computer-readable medium of claim 10, wherein the instructions to self-configure the interconnection between the first controller and the second controller comprise instructions to self-configure the interconnection such that the first controller uses the second controller as a subordinate controller when solving the optimization problem.

16. The tangible, non-transitory, computer-readable medium of claim 10, wherein the instructions to instruct the control system to provide the control system configuration data to the first controller comprise instructions to retrieve the control system configuration data from a cloud.

17. A method for performing diagnostics on a control system comprising:
    determining, using one or more processors, holistic state data captured by a controller implemented in the control system, wherein the holistic state data indicates that the controller determines an operational parameter of an actuator measured by a sensor;
    simulating, using the one or more processors, operation of the controller based at least in part on the holistic state data while the controller performs one or more other operations;
    analyzing, using the one or more processors, simulation of the controller to perform diagnostics on the controller; and
    adjusting, using the one or more processors, operation of the control system based at least in part on the diagnostics to enable the control system to determine a control action that facilitates optimizing performance of an automation process when implemented by the actuator.

18. The method of claim 17, wherein:
    simulating the operation of the controller comprises simulating performance of various control actions by the controller; and
    analyzing the simulation of the controller comprises analyzing results of the various control actions.

19. The method of claim 17, wherein analyzing the simulation comprises:
    determining a predicted response to the control action determined by the controller using a process model; and
    comparing the predicted response with an actual response to the control action to determine accuracy of the process model.

20. The method of claim 19, comprising adjusting the process model when the predicted response and the actual response vary.

* * * * *